United States Patent
Dobashi

(10) Patent No.: US 12,510,897 B2
(45) Date of Patent: Dec. 30, 2025

(54) RETURN NODE MAP

(71) Applicant: Honda Motor Co., Ltd., Tokyo (JP)

(72) Inventor: Manabu Dobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 17/886,447

(22) Filed: Aug. 11, 2022

(65) Prior Publication Data

US 2024/0053765 A1    Feb. 15, 2024

(51) Int. Cl.
| | |
|---|---|
| *G05D 1/00* | (2024.01) |
| *A01B 69/04* | (2006.01) |
| *A01D 34/00* | (2006.01) |
| *A01D 101/00* | (2006.01) |
| *B60L 53/36* | (2019.01) |

(52) U.S. Cl.
CPC ......... *G05D 1/0278* (2013.01); *A01B 69/008* (2013.01); *A01D 34/008* (2013.01); *B60L 53/36* (2019.02); *G05D 1/0214* (2013.01); *G05D 1/0225* (2013.01); *A01D 2101/00* (2013.01); *B60L 2200/40* (2013.01)

(58) Field of Classification Search
CPC .. G05D 1/0278; G05D 1/0214; G05D 1/0225; G05D 1/247; G05D 2105/15; G05D 2107/23; G05D 2109/10; G05D 2111/36; G05D 1/248; G05D 1/661; A01B 69/008; A01D 34/008; A01D 2101/00; B60L 53/36; B60L 2200/40; B60L 2240/12; B60L 2240/16; B60L 2240/20; B60L 2240/461; B60L 2240/622
See application file for complete search history.

(56) References Cited

U.S. PATENT DOCUMENTS

| | | | |
|---|---|---|---|
| 2002/0143461 A1* | 10/2002 | Burns | G05D 1/0297 701/23 |
| 2012/0209512 A1* | 8/2012 | Kujirai | G01C 21/3423 701/428 |

(Continued)

FOREIGN PATENT DOCUMENTS

| | | |
|---|---|---|
| EP | 3225096 | 10/2017 |
| EP | 3346348 | 7/2018 |

(Continued)

OTHER PUBLICATIONS

"Pathfinding—Understanding A* (A star)". User Tarodev. URL: https://www.youtube.com/watch?v=i0x5fj4PqP4. Posted Nov. 16, 2021. (Year: 2021).*

*Primary Examiner* — Hunter B Lonsberry
*Assistant Examiner* — Henry R Hinton
(74) *Attorney, Agent, or Firm* — JCIPRNET

(57) ABSTRACT

An autonomous work vehicle includes a position information obtaining unit, a driving unit, a control unit, and a memory. The position information obtaining unit includes a GNSS receiver acquiring a position of the autonomous work vehicle. The driving unit includes a motor. The control unit includes a processor. The memory stores a position of a plurality of travel nodes, wherein the processor calculates a direction of one of the plurality of travel nodes that is closest to a current position of the autonomous work vehicle, and the driving unit drives the autonomous work vehicle in a direction moving towards the direction of the one of the plurality of travel nodes calculated by the processor.

6 Claims, 13 Drawing Sheets

(56) References Cited

U.S. PATENT DOCUMENTS

| | | | |
|---|---|---|---|
| 2018/0143641 A1* | 5/2018 | Rao | G01C 21/3469 |
| 2019/0147558 A1* | 5/2019 | Cheikh | G01G 19/52 |
| | | | 361/679.4 |
| 2021/0084812 A1* | 3/2021 | Matus | A01D 34/008 |
| 2022/0163969 A1* | 5/2022 | Li | G08G 1/096811 |
| 2022/0342421 A1* | 10/2022 | Kearns | G05D 1/0219 |
| 2023/0259873 A1* | 8/2023 | Yamaguchi | G06Q 10/08 |
| | | | 705/333 |
| 2023/0294296 A1* | 9/2023 | Wallmark | A01D 34/008 |
| | | | 700/245 |

FOREIGN PATENT DOCUMENTS

| | | | |
|---|---|---|---|
| EP | 3829830 | 6/2021 | |
| WO | 2021066702 | 4/2021 | |
| WO | 2021188028 | 9/2021 | |
| WO | WO-2021193412 A1 * | 9/2021 | G05D 1/246 |

* cited by examiner

RETURN NODE MAP

BACKGROUND OF THE DISCLOSURE

Technical Field

The disclosure relates to a travel route control of an autonomous work vehicle, and more specifically relates to the travel route control of the autonomous work vehicle using a travel node.

Related Art

Conventionally, the autonomous work vehicle such as a robotic lawn mower has a need to return to a power charging station for charging power.

In one example, a guide wire may be disposed in a working area of the robotic lawn mower, wherein the guide wire acts as a guide for guiding the robotic lawn mower to a predetermined destination (such as the power charging station). In a situation when the robotic lawn mower traces the guide wire to the predetermined destination, a travel distance of the robotic lawn mower may be increased and power may be wasted.

In another example, the robotic lawn mower may advance straight to the predetermined destination based on a GPS signal or the like. However, in a case where the working area has a complicated shape or an obstacle, there is a possibility the robotic lawn mower may not reach the predetermined destination.

Therefore, a means for the robotic lawn mower to reach the predetermined destination is needed.

SUMMARY

According to an embodiment of the disclosure, an autonomous work vehicle includes a position information obtaining unit, a driving unit, a control unit, and a memory. The position information obtaining unit includes a GNSS receiver acquiring a position of the autonomous work vehicle. The driving unit includes a motor. The control unit includes a processor. The memory stores a position of a plurality of travel nodes, wherein the processor calculates a direction of one of the plurality of travel nodes that is closest to a current position of the autonomous work vehicle, and the driving unit drives the autonomous work vehicle in a direction moving towards the direction of the one of the plurality of travel nodes calculated by the processor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
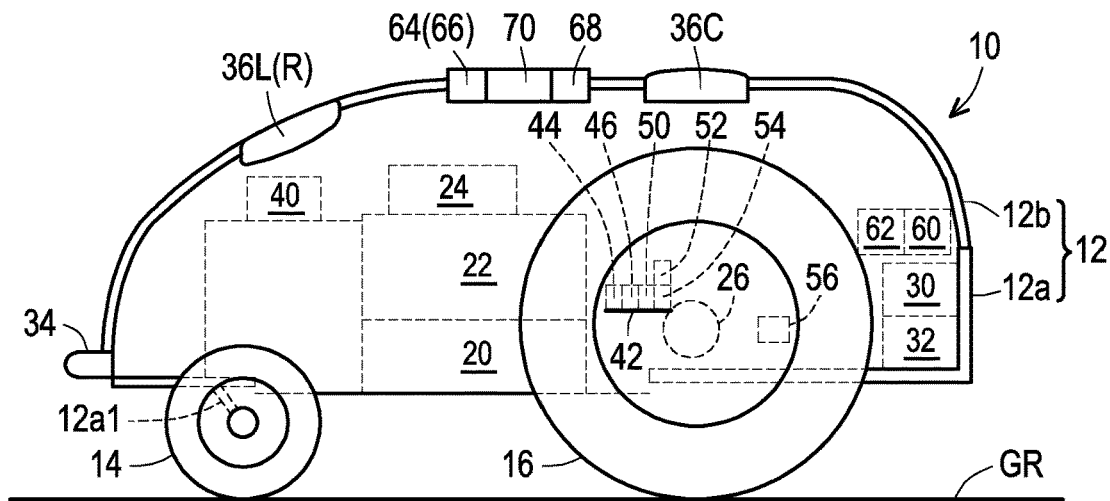
FIG. 1 is an overall schematic diagram showing a utility vehicle according to an embodiment of this disclosure.
Figure 2:
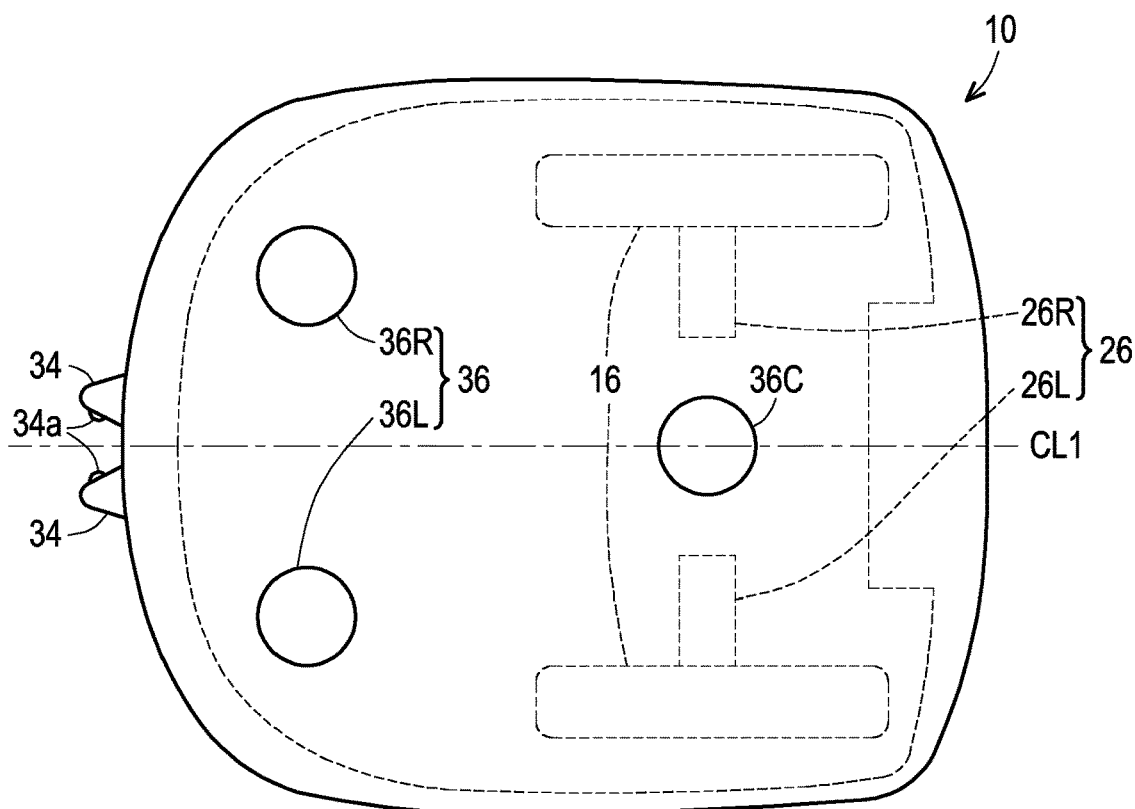
FIG. 2 is a plan view of the utility vehicle illustrated in FIG. 1.
Figure 3:
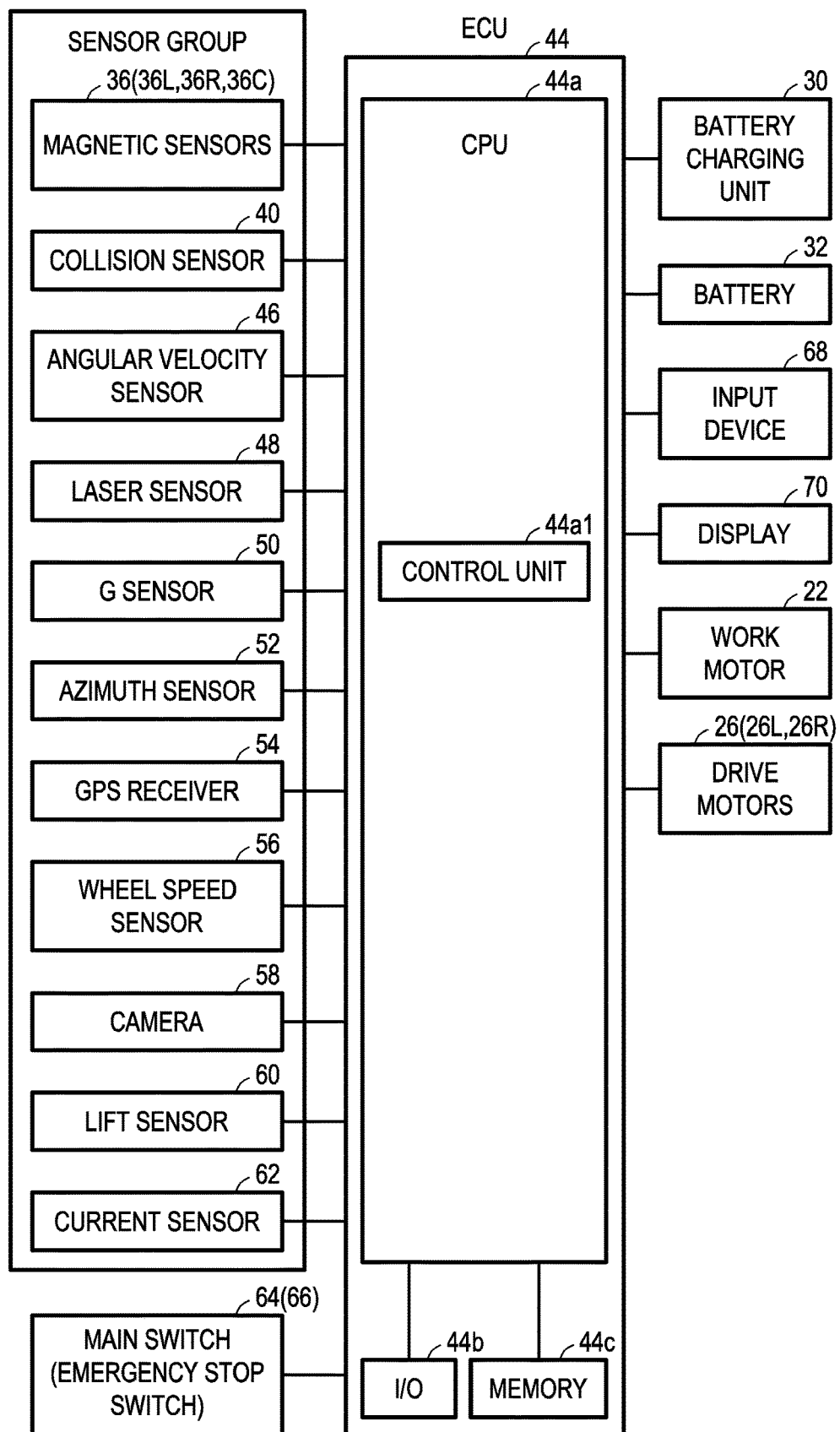
FIG. 3 is a block diagram showing inputs to an Electronic Control Unit installed in the utility vehicle illustrated in FIG. 1.

FIG. 1 is an overall schematic diagram showing a utility vehicle according to an embodiment of this disclosure, FIG. 2 is a plan view schematically illustrating the configuration of the utility vehicle illustrated in FIG. 1; and FIG. 3 is a block diagram showing the configuration of an electronic control unit (ECU) of the utility vehicle according to the present embodiment.

As shown in FIG. 1, reference symbol 10 designates a utility vehicle, more specifically an autonomous work vehicle, e.g., a robotic lawn mower, a cleaning robot, etc; hereinafter after also called "vehicle".

The utility vehicle of the present disclosure can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22. The electric motor 22 is an example of a driving unit.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 10, for example, may be such that it can be transported or carried by the operator. As an example, the vehicle 10 may have a total length (forward-rearward direction length) about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle. The vehicle 10 is an example of an autonomous work vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a body center line CL of the vehicle body 12 running in the forward-rearward direction along the widthwise center of the vehicle 10. In addition, a third magnetic sensor 36C is installed on the body center line CL1 at a location remote from the sensors 36L and 36R. The magnetic sensors 36 produces an output indicating magnitude of magnetic field signal (magnetic field strength or intensity). The magnetic sensors 36R, 36L, 36C are examples of a signal detection part of the disclosure.

A collision (contact) sensor 40 is attached to the frame 12b. The collision sensor 40 outputs an ON signal when the frame 12b detaches or temporarily separates from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor or processor) 44a, I/O 44b, and memory (ROM, RAM, EEPROM, etc.) 44c and the like. The ECU 44 is an example of a control unit.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that acquires a position of the vehicle 10).

The GPS receiver 54 is an example of a Global Navigation Satellite System (GNSS) receiver, and acquires a position of the vehicle 10. The GNSS receiver is an example of a position information obtaining unit. As an example, the position data or position coordinates may be transmitted in National Marine Electronics Association (NMEA) format wherein the longitudinal and latitudinal coordinates are represented by degrees and decimal minutes.

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotate one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the work in the working area AR.

The detection of the working area AR and the work thereat will be explained with reference to FIG. 4.

The working area AR is delineated by laying (burying) a boundary wire (electrical wire) 72 around a periphery (boundary) of the working area AR. A charging station 76 for charging the battery 22 of the vehicle 10 may be installed inside or outside of the working area AR. In FIG. 4, the charging station 76 is disposed at a location inside the working area AR. However, the disclosure is not limited thereto.

Figure 4:
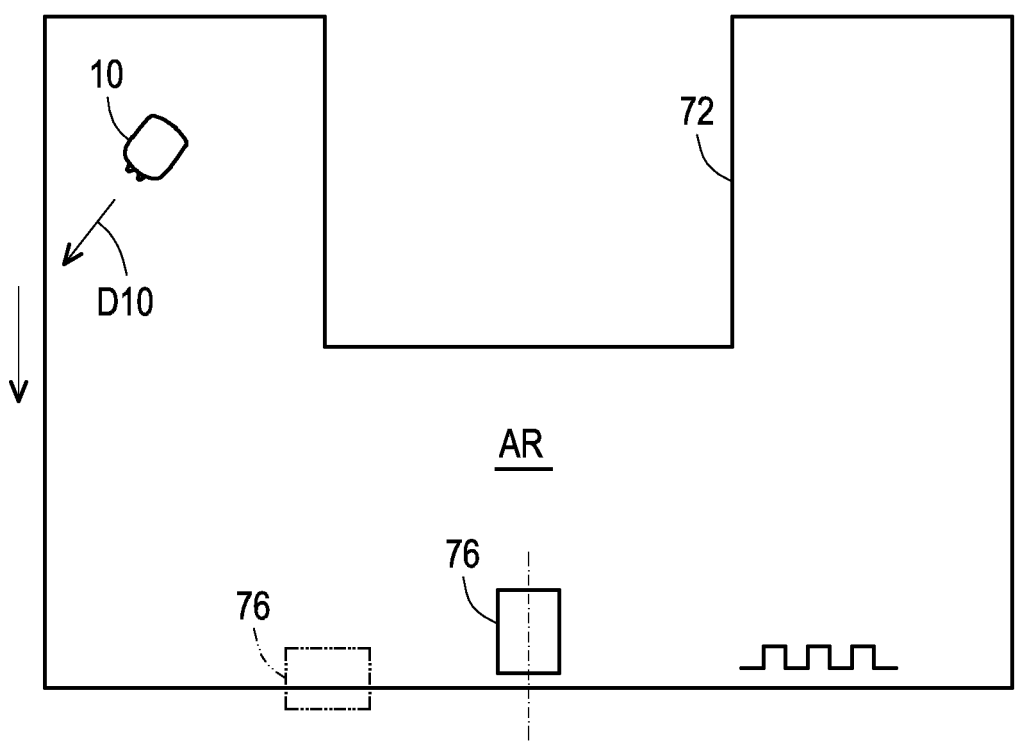
FIG. 4 is an explanatory diagram showing a working area (delimited by a boundary wire) of the utility vehicle illustrated in FIG. 1.
Figure 5:
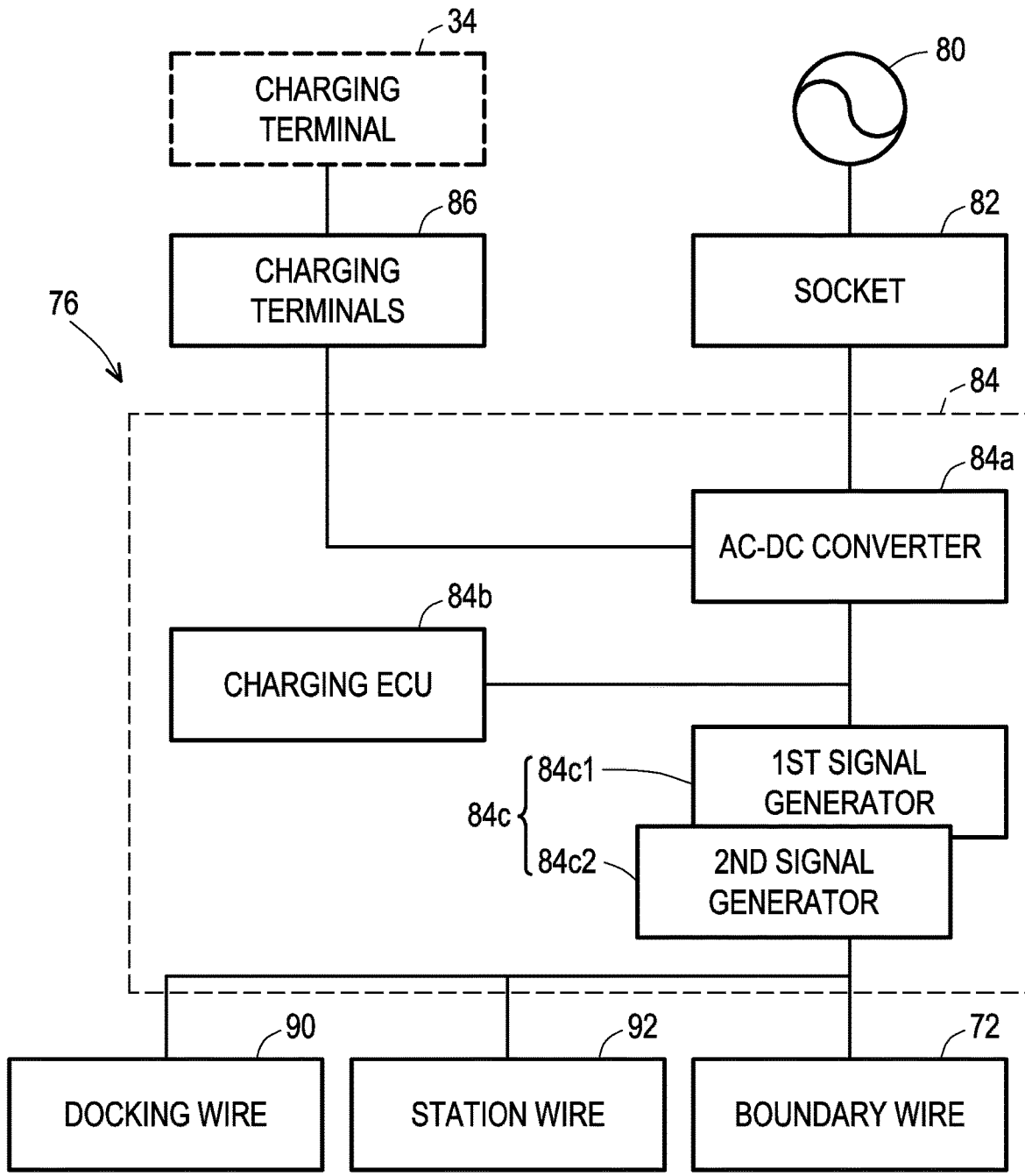
FIG. 5 is a block diagram showing configuration of a charging station of the utility vehicle shown in FIG. 4.

FIG. 5 is a block diagram showing an electrical configuration of a charging station in FIG. 4.

As shown in FIG. 5, the charging station 76 is equipped with a charger 84 connected to a commercial power supply 80 through a socket 82, and a pair of charging terminals 86 connected to the charger 84. The pair of charging terminals 86 are configured to be connectable to the pair of charging terminals 34 disposed on the vehicle 10 through the contacts 34 *a* (shown in FIG. 2) of the pair of charging terminals 34.

The charger 84 is equipped with an AC-DC converter 84*a*, a charging ECU (Electronic Control Unit) 84*b* also comprising a microcomputer and used to control operation of the AC-DC converter 84*a*, and two signal generators 84*c* (a first signal generator 84*c*1 and a second signal generator 84*c*2). The first signal generator 84*c*1 and the second signal generator 84*c*2 are examples of a signal generating device.

The charging station 76 is configured so that alternating current passing from the commercial power supply 80 through the socket 82 is converted to direct current and is stepped down to a suitable voltage by the AC-DC converter 84*a* of the charger 84 and sent to the charging terminals 86 to charge the onboard battery 32 through the charging contacts 34 and 86 when the lawnmower 10 is returned and connected to the charging station 76. The AC-DC converter 84*a* steps down the current to a suitable voltage in response to commands determined by the ECU 44 and sent from the charging ECU 84*b*.

At the same time, the output of the AC-DC converter 84 is supplied to the charging ECU 84*b* and signal generators 84*c* (comprising a first signal generator 84*c*1 and a second signal generator 84*c*2). The charging ECU 84*b* is configured to be capable of communicating with the ECU 44 and controls operation of the first signal generators 84*c*1 and the second signal generator 84*c*2 by sending binary data pulses.

In response thereto, the first and second signal generators 84*c*1, 84*c*2 convert the direct current stepped down by the AC-DC converter 84*a* into area signals in continuance sequence of pulse train and supply the generated area signals to the boundary wire 72, a docking wire 90 for guiding the vehicle 10 to a charging position, and a station wire 92 for delineating the charging station 76.

Figure 6:
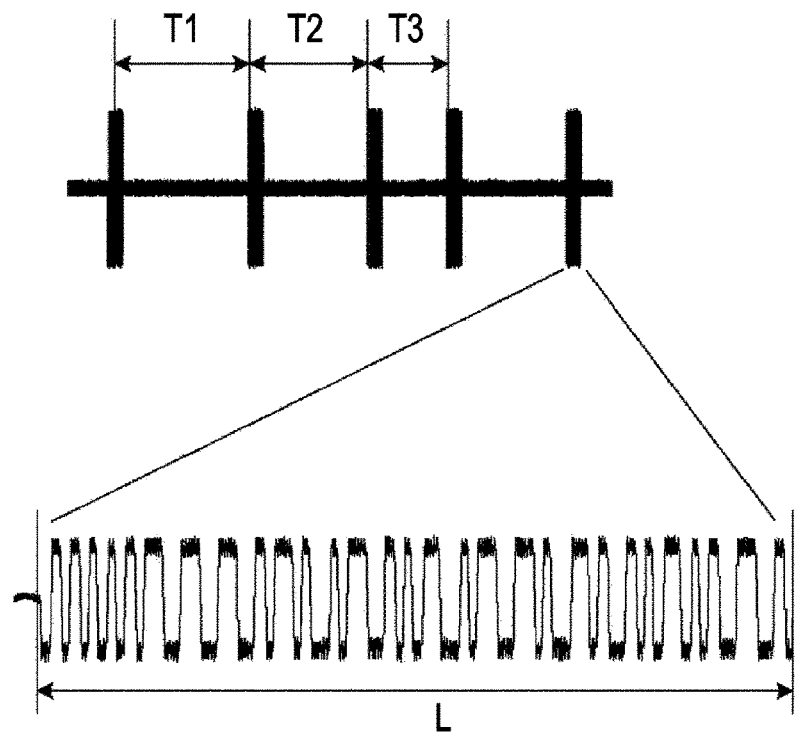
FIG. 6 is an explanatory diagram showing data signal of pulse train generated by a signal generator illustrated in FIG. 5.

FIG. 6 shows the pulse train generated by the first signal generator 84*c*1 to be passed through the boundary wire 72 that is corresponding to the binary data pulses sent from the charging ECU 84*b*. Although not shown, the pulse train signal generated by the second signal generator 84*c*2 may be similar to the pulse train generated by the first signal generator 84*c*1. However, in another embodiment of the disclosure, the pulse train signal generated by the second signal generator 84*c*2 may be different from the pulse train signal generated by the first signal generator 84*c*1. By generating different pulse train signals, different wires (such as area wire 72, guide wire 73, docking wire 90, station wire 92) may be differentiated and recognized by the vehicle 10 based on pulse train of the detected signal, and a general location of the vehicle 10 may be deduced. It should be understood, a number of the signal generators may be determined according to requirements and is not limited to the first and second signal generators 84*c*1, 84*c*2. In addition, the "wire" recited herein may refer to any wire, for example, the area wire 72, the guide wire 73, the docking wire 90, the station wire 92 and the like. In the present disclosure, for example, the guide wire 73 is configured as a shortcut wire for the vehicle 10 to return to the station 76. In other words, the guide wire is an example of the shortcut wire.

The detection of the working area AR shown in FIG. 4 will be explained.

When electric current of the data signal shown in FIG. 6 is supplied to the boundary wire 72 by the first signal generator 84*c*1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72. The magnetic sensors 36L, 36R, 36C are configured to detect a signal emitted by a signal generating device such as the first and second signal generators 84*cl*, 84*c*2.

Figure 7:
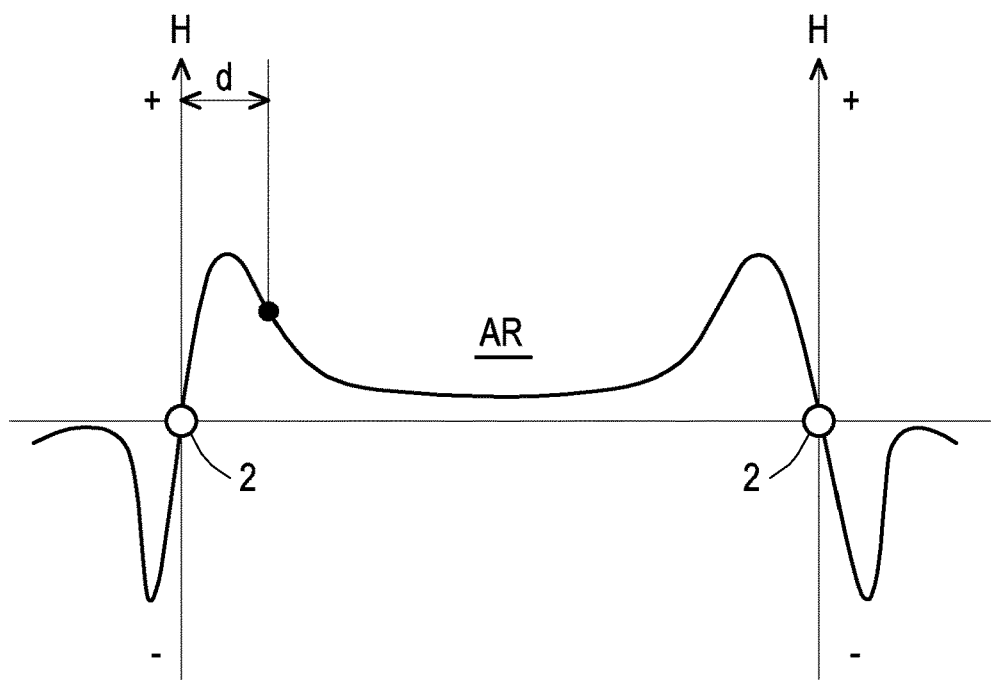
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44*c*. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
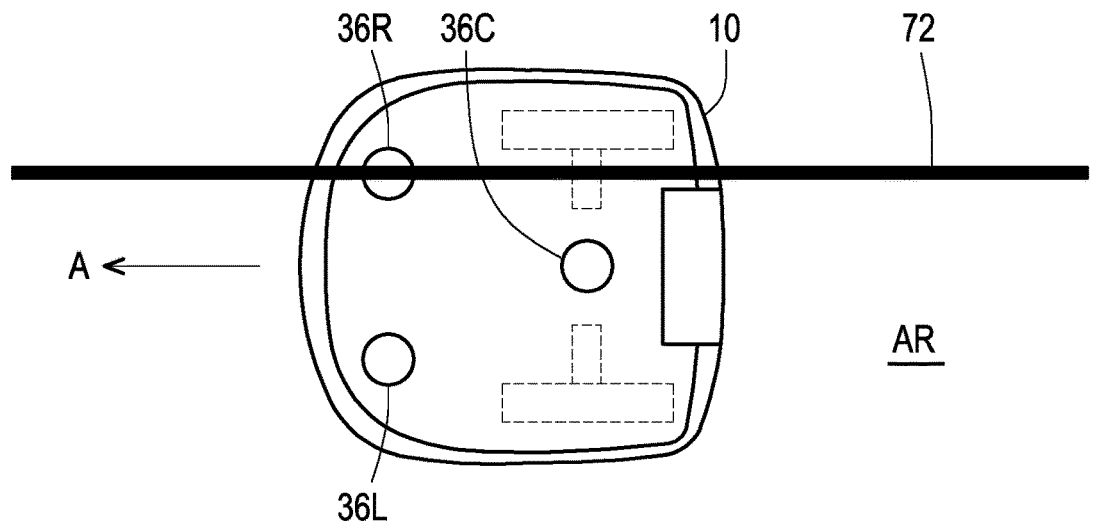
FIG. 8 is an explanatory diagram showing operation in trace mode of the vehicle illustrated in FIG. 1.

FIG. 8 is a diagram showing operation of the vehicle 10 in trace mode. As shown in FIG. 8, in trace mode the vehicle 10 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

In the above embodiment, it was described where the magnetic sensor 36R detects a magnetic field signal emitted from a boundary wire 72 disposed at a working area AR, wherein the control unit 26 controls the vehicle 10 to trace the boundary wire 72 so that magnetic field strength H detected by the magnetic sensor 36R stays at 0, such that the vehicle 10 runs on the boundary wire 72.

In another embodiment of the disclosure, the control unit 26 may control the vehicle 10 to trace the boundary wire 72 at a predetermined variable distance by steering the vehicle 10 to keep the detected magnetic field signal H within a predetermined range or at a predetermined magnetic field signal H. The predetermined variable distance, for example, may be set between 1-2 meters, 2-5 meters, 1.3-3.6 meters, 2.0-10.0 meters and the like. The predetermined magnetic field signal H may correspond to a distance of 1.0, 2.0, 3.5 meters from the wire and the like. However, the disclosure is not limited thereto. The predetermined variable distance may be set to other distances or between other distance ranges according to requirements. The predetermined variable distance is set by keeping the detected magnetic field signal H within a predetermined range that corresponds to the target distances. The predetermined variable distance refers to, for example, a distance from the wire being traced to the body center line CL1 of the vehicle 10. In another embodiment of the disclosure, the predetermined variable distance refers to, for example, a distance from the wire to a side of the vehicle 10 that is closest to the wire. In another embodiment of the disclosure, the predetermined variable distance refers to, for example, a distance from the wire to a side of the frame 12b of the vehicle 10 that is closest to the wire. In another embodiment of the disclosure, the predetermined variable distance refers to, for example, a distance from the wire to one of the magnetic sensors 36.

Figure 9:
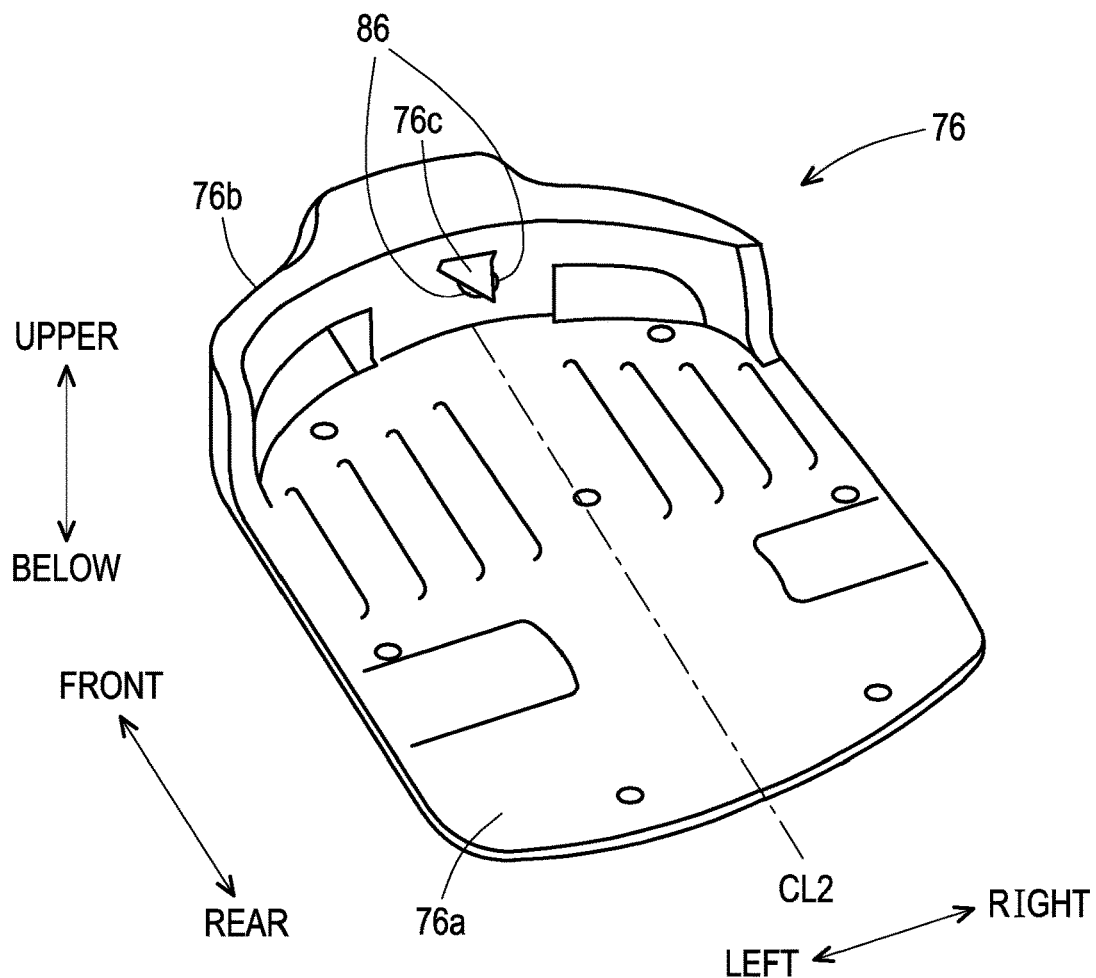
FIG. 9 is a perspective diagram illustrating the physical structure of the charging station according to an embodiment of the disclosure.

FIG. 9 is a perspective diagram illustrating the physical structure of the charging station 76 according to this embodiment. For convenience in the following, three orthogonal directions shown in the drawing are respectively defined as forward-rearward direction (length direction), lateral direction (width direction) and vertical direction (height direction) of the charging station 76.

As seen in FIG. 9, the charging station 76 has a base plate 76a of substantially the same size as the vehicle 10 for retaining the vehicle 10 during charging, a guide 76b erected at the front end of the base plate 76a for constraining position of the vehicle 10 during charging, and a substantially triangular terminal unit 76c projecting rearward from an upper and laterally middle part of the guide 76b.

The terminal unit 76c is configured to be insertable between the pair of left-right battery charging terminals 34 of the vehicle 10, and the pair of left-right terminals 86 of the charging station 76 is symmetrically provided with respect to a longitudinal direction axis CL2 passing through the center of the charging station 76, whereby the structure enables charging of the onboard battery 32 through the terminals 86 and 34.

As shown in FIG. 4, in this embodiment the charging station 76 is installed inside the working area AR, and in an orientation perpendicular to the boundary wire 72.

In the charging station 76, the aforesaid battery charging unit 84 is mounted on a circuit board (not shown) accommodated inside the guide 76b, and the battery charging unit 84 has connected thereto the docking wire 90 for guiding the vehicle 10 to the docking position for docking with the charging terminals 86 and the station wire 92 for, in advance of the docking, guiding the vehicle 10 by enabling it to recognize and approach the position of the charging station 76.

Figure 10:
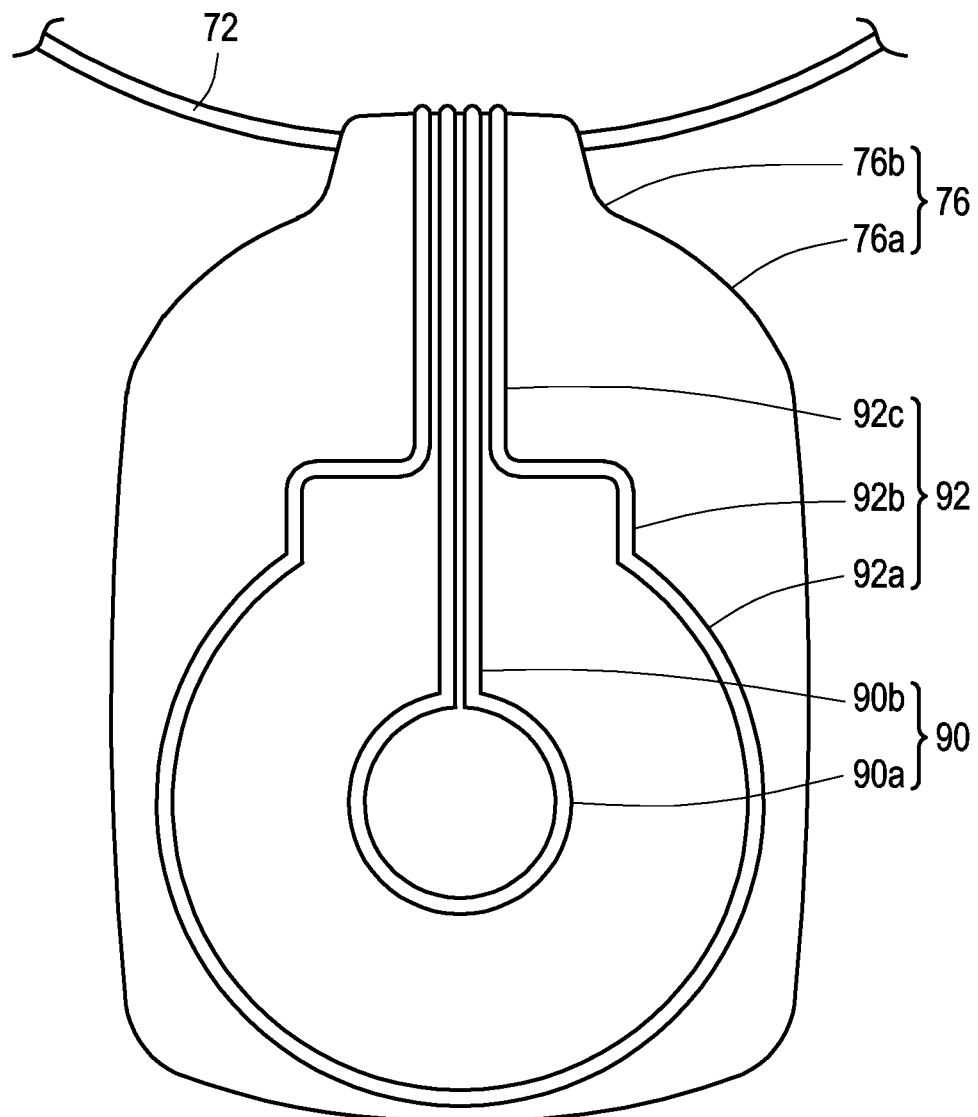
FIG. 10 is a top plan views of a base plate of the charging station shown in FIG. 9.

As illustrated FIG. 10, the charging station incorporates the docking wire 90 and station wire 92 in addition to the base plate 76a.

Next, the utility vehicle 10 returning to a predetermined destination (charging station 76) based on a return node map according to an embodiment of the disclosure will be described.

Figure 11:
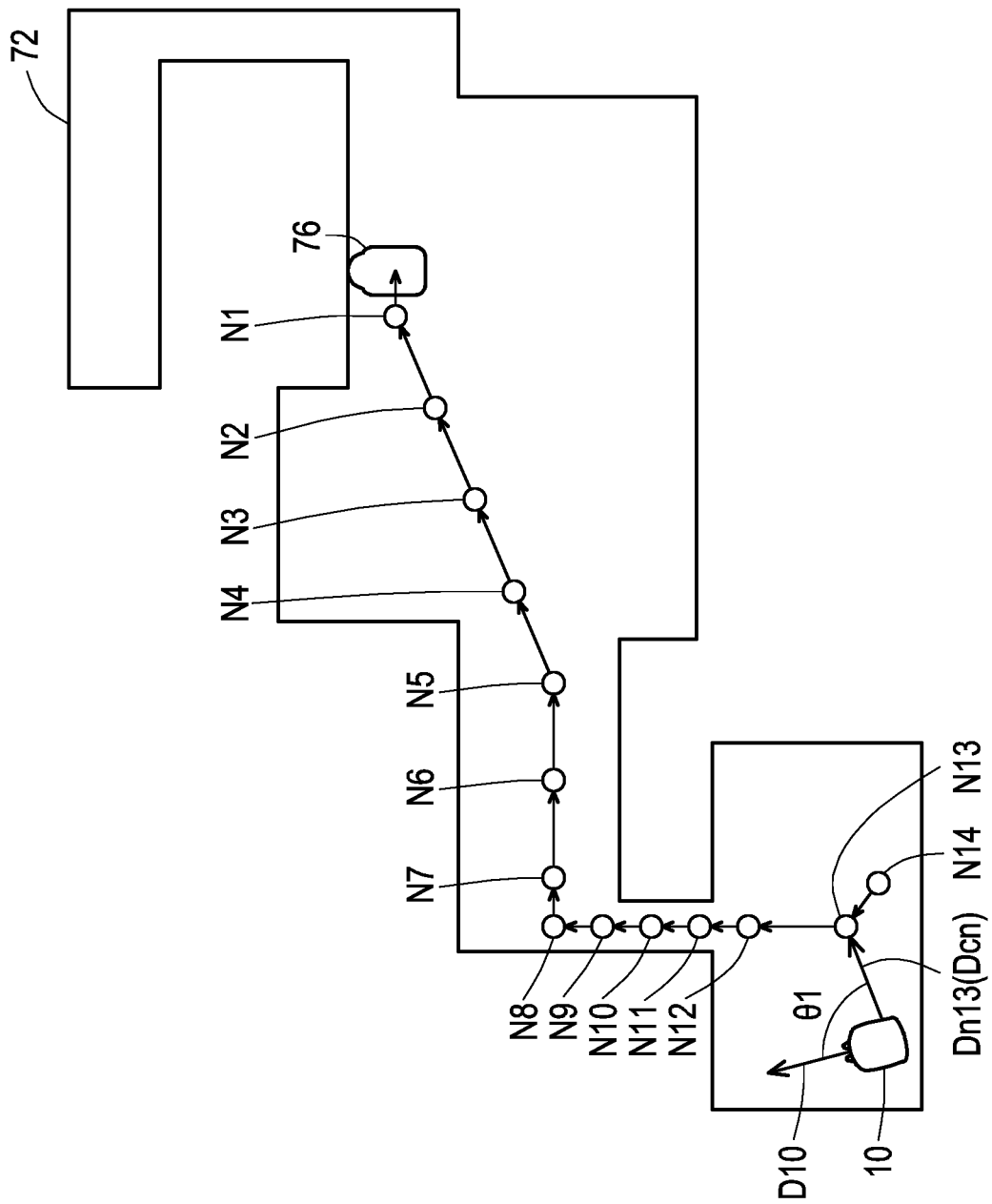
FIG. 11 is a schematic diagram illustrating the utility vehicle returning to a predetermined destination based on a return node map according to an embodiment of the disclosure.

FIG. 11 is a schematic diagram illustrating the utility vehicle returning to a predetermined destination based on a return node map according to an embodiment of the disclosure. Referring to FIG. 11, a return node map M1 is shown. Travel nodes N are positioned on the return node map M1, and includes a plurality of travel nodes N1-N14. The predetermined destination (such as the charging station 76) may be denoted, for example, by a travel node NO. A number of the plurality of travel nodes N is not limited hereto, and may be set according to requirements. The plurality of travel nodes N1-N14 act as a waypoint for guiding the vehicle 10 to the predetermined destination such as the charging station 76.

Each of the plurality of travel nodes N1-N14 is assigned position coordinates, for example, a longitudinal coordinate X and a latitudinal coordinate Y to define a position of each of the plurality of travel nodes N1-N14 on the return node map M1. The travel node N is used to guide the autonomous work vehicle 10 to the charging station 76 (a predetermined destination).

The position coordinates X, Y of each of the plurality of travel nodes N1-N14 may be assigned, for example, by using a GPS receiver disposed on a terminal device such as a smart phone and the like. For example, a user may travel (walk, run, etc.) a route starting from a position denoted by the travel node N14 to the charging station 76 (a predetermined destination). While the user travels to the charging station 76, an app of the terminal device may obtain and record the longitudinal coordinate X and the latitudinal coordinate Y of the terminal device every 1.0 second. That is to say, the position coordinates X, Y of the travel node N13 may be obtained 1 second after the position coordinates X, Y of the travel node N14 is obtained, and the position coordinates X, Y of the travel node N12 is obtained 1 second after the position coordinates X, Y of travel node N13 is obtained. The predetermined time elapsed between each travel node is not limited to 1.0 second, and may be set according to requirements.

In another embodiment of the disclosure, the position coordinates X, Y of the plurality of travel nodes N1-N14 may be obtained based on a predetermined travel distance, instead of the predetermined elapsed time. For example, the predetermined travel distance between the travel node N14 and the travel node N13 may be set to 1.0 meters, 1.5 meters, 2 meters and the like according to requirements.

In another embodiment of the disclosure, the position coordinates X, Y of each of the plurality of travel nodes N1-N14 may be assigned, for example, by using the GPS receiver 54 disposed on the vehicle 10 (instead of the GPS disposed on the terminal device). For example, the vehicle 10 may be operated by remote control, and the position coordinates X, Y obtained based on a predetermined elapsed time or a predetermined travel distance or the like.

In another embodiment, the position coordinates X, Y of each of the plurality of travel nodes N1-N14 may be assigned by a calculator having a processor configured to set the plurality of travel nodes N1-N14 for guiding the autonomous work vehicle 10 to the charging station 76. In other words, in an embodiment of the disclosure, it may not be necessary to have a predetermined elapsed time or predetermined travel distance associated between the plurality travel nodes N1-N14. The processor of the calculator may be, for example, the processor 44a of the vehicle 10, or a processor of a computer server that is external to the vehicle 10.

The processor may set the position coordinates X, Y of each of the travel nodes N based on information regarding a work area in which the autonomous work vehicle 10 works and information regarding a position information of a station 76. The work area of the vehicle 10 is an area defined by, for example, the boundary wire 72. The charging station 76 is where the autonomous work vehicle 10 docks to recharge power, or where the autonomous work vehicle 10 waits in a standby state. In this way, the vehicle 10 may return to the station 76 efficiently according to the travel nodes N set based on the information regarding a work area in which the autonomous work vehicle 10 works and information regarding a position information of the charging station 76.

The vehicle 10 further includes a communication unit, configured to communicate with the computer server, wherein the vehicle 10 obtains information regarding the plurality of travel nodes N1-N14 from the server. The communication unit of the vehicle 10 may include a transmitter and a receiver for communicating with the computer server. In this way, the vehicle 10 may receive the information regarding the travel nodes N, and the information regarding the travel nodes N may be updated according to, for example, user preferences such as rut reduction, shortest travel distance to destination and/or the like.

The information regarding the work area in which the autonomous work vehicle 10 works may include, for example, information detailing the position coordinates of the working area of the autonomous work vehicle 10, information detailing the position coordinates of the boundary that is delineated by the boundary wire 72, and/or the like.

Information regarding the position information of the charging station 76 may include, for example information detailing the position coordinates of the charging station 76. In an embodiment of the disclosure, the position information of the charging station 76 may be set by a user. In another embodiment of the disclosure, the GPS receiver 54 of the vehicle 10 may acquire a position of the vehicle 10 while the vehicle 10 is docked at the charging station 76. In this way, there is not need for a user to set a location of the charging station.

The calculator may further obtain work information (travel path information, information detailing the position coordinates of obstacles such as trees, water, etc.) of the autonomous work vehicle 10, such that the calculator sets the plurality of travel nodes N1-N14 based on the work information, the information regarding the work area in which the autonomous work vehicle 10 works, and the information regarding the position information of the station 76. In this way, the vehicle 10 may return to the station 76 efficiently according to the travel nodes N set based on each information.

The calculator may further obtain work vehicle information (load information, battery charge level, vehicle error information) of the autonomous work vehicle 10, such that the calculator sets the plurality of travel nodes N1-N14 based on the work vehicle information, the information regarding the work area in which the autonomous work vehicle works 10, and information regarding the position information (position coordinates) of the station 76. In this way, the travel nodes N may be set in consideration of travel routes which may reduce ruts, avoid obstacles, reduce areas of uncut grass or the like.

Various examples of assigning a position (for example, position coordinates X, Y) of the plurality of travel nodes N1-N14 were described above. After the position of the plurality of travel nodes N1-N14 have been assigned, the memory 44c of the vehicle 10 stores the position of the plurality of travel nodes N1-N14.

Next, referring to FIG. 11, the processor 44a of the vehicle 10 calculates a direction of a closest node Dcn, among the plurality of travel nodes N1-N14, that is closest to a current position of the autonomous work vehicle 10. In the embodiment of FIG. 11, the node N13 is closest to the current position of the autonomous work vehicle 10, such that the direction of the node Dn13 is calculated as the direction of the closest node Dn13(Dcn). After the direction of the closest node Dcn is obtained, the driving unit (motor 26) drives the autonomous work vehicle 10 in a direction moving towards the direction of the closest node Dn13(Dcn) calculated by the processor 44a. More specifically, the motor 26 drives the autonomous work vehicle 10 in the direction of the closest node Dn13(Dcn) calculated by the processor 44a.

By managing the travel route of the vehicle 10 using the travel nodes N instead of by lines, an amount of data associated with the travel route of the vehicle 10 may be reduced. That is to say, data associated with the travel route may be reduced when the travel route of the vehicle 10 is managed using travel nodes N, instead of travel lines. Consequently, the amount of data associated with the travel route that is to be stored in a memory may be reduced by the travel nodes N. Furthermore, by managing the travel route of the vehicle 10 using the travel nodes N instead of by travel lines, customization and changes to the travel route may be possible on short notice since there may be less data associated with the travel nodes N compared to the travel lines. For example, quick customization may be possible such as changing a travel node N into an obstacle O.

Referring to FIG. 11, the ECU 44 is configured to calculate a direction of the closest node Dn13(Dcn) relative to a current position of the vehicle 10. The direction is calculated using the current position of the vehicle 10 and the position of the closest node (for example, node N13 in FIG. 11). In more detail, the ECU 44 calculates a first angle θ1. The first angle θ1 is calculated by a difference in angle between the direction of the closest node Dn13(Dcn) and a current pointing direction D10 of the vehicle 10. The current pointing direction D10 of the vehicle 10 is acquired from a change between a current GPS location and a GPS location obtained after traveling straight for a predetermined distance. In addition, the current pointing direction D10 of the vehicle 10 may be calculated using a combination of an angular velocity obtained from the angular velocity sensor (yaw-rate sensor; yaw sensor) 46, an acceleration obtained from the G sensor (acceleration sensor) 50, an azimuth obtained from the direction sensor 52 that generates the output indicating direction (azimuth) of the vehicle 10 according to terrestrial magnetism, and position information obtained from the GPS (Global Positioning System) receiver 54.

Referring to FIG. 11, after the first angle θ1 is obtained, the ECU 44 turns the vehicle 10 by an amount calculated by the first angle θ1 such that the direction of the closest node Dn13(Dcn) and the current pointing direction D10 of the vehicle 10 are aligned. In other words, the ECU 44 is configured to steer the vehicle 10 to align the traveling direction D10 of the vehicle 10 with the direction of the closest node Dn13(Dcn) calculated by the ECU. After the traveling direction D10 of the vehicle 10 is aligned with the direction of the closest node Dn13(Dcn), the drive motors 26 drives the vehicle 10 straight in the direction of the closest node Dn13(Dcn) calculated by the ECU 44. The vehicle 10 may use the "pivot-turn" described above to align the traveling direction D10 of the vehicle 10 with the direction of the closest node Dn13(Dcn), however the disclosure is not limited thereto.

Referring to FIG. 11, each of the plurality of travel nodes N1-N14 is stored with a direction information specifying a direction (note: arrow stemming from each of the plurality of travel node N1-N14) in which the autonomous work vehicle 10 is to advance after the autonomous work vehicle 10 arrives to each of the plurality of travel nodes N1-N14. For example, the travel node N14 stores direction information specifying a direction to the travel node N13 from the travel node N14. Similarly, the travel node N13 stores direction information specifying a direction to the travel node N12 from the travel node N13. Likewise, the travel node N1 stores direction information specifying a direction to the station 76 from the travel node N1. Once the vehicle 10 arrives to the travel node Nx, then the vehicle 10 changes the travel direction of the vehicle 10 to the direction information specified by the travel node Nx.

The autonomous work vehicle 10 may be considered as arrived to each of the plurality of travel nodes N1-N14 when the autonomous work vehicle 10 arrives to a location, for example, within a predetermined radius of each of the plurality of travel nodes N1-N14. However, the disclosure is not limited thereto, and the autonomous work vehicle 10 may considered as arrived to each of the plurality of travel nodes N1-N14 based on other criteria according to requirements.

The direction information specifying the direction in which the autonomous work vehicle 10 is to advance may be specified, for example, in degrees from north. North may be, for example, true north or magnetic north. In another embodiment of the disclosure, the direction information specifying the direction in which the autonomous work vehicle 10 is to advance may be specified, for example, in cardinal directions. However, the disclosure is not limited hereto. The above are examples only, and the direction information specifying the direction in which the autonomous work vehicle 10 is to advance may be specified in other ways according to requirements.

In another embodiment of the direction, the vehicle 10 may compare the position coordinates of one travel node (for example, travel node N14) to the position coordinates of the next travel node (for example, travel node N13), and store the difference between the position coordinates of the travel node N14 and the travel node N13 as the direction information specifying the direction in which the autonomous work vehicle 10 is to advance. That is to say, the difference between the position coordinates of the travel node N14 and the travel node N13 may represent the direction information being expressed in vector form, for example, V (x, y), where x, y is the difference between the position coordinates of the travel node N14 and the travel node N13.

In this way, the vehicle 10 may move efficiently to the predetermined destination (such as the charging station 76) by tracing the direction information specified in each of the travel nodes N. Furthermore, by registering the travel route of the vehicle 10 using the travel nodes N, it is possible to reduce an amount of data stored in the memory and/or reduce the amount of calculations to be performed. In addition, the vehicle 10 may move efficiently even when the travel route is complex.

In an embodiment of the disclosure, the vehicle 10 may start traveling after the direction information assigned to each travel node Nis calculated. In another embodiment of the disclosure, the vehicle 10 may start traveling before the calculation of the direction information of all of the travel nodes is completed, and may perform calculation and assigning while the vehicle 10 is travelling to a travel node N.

Figure 12:
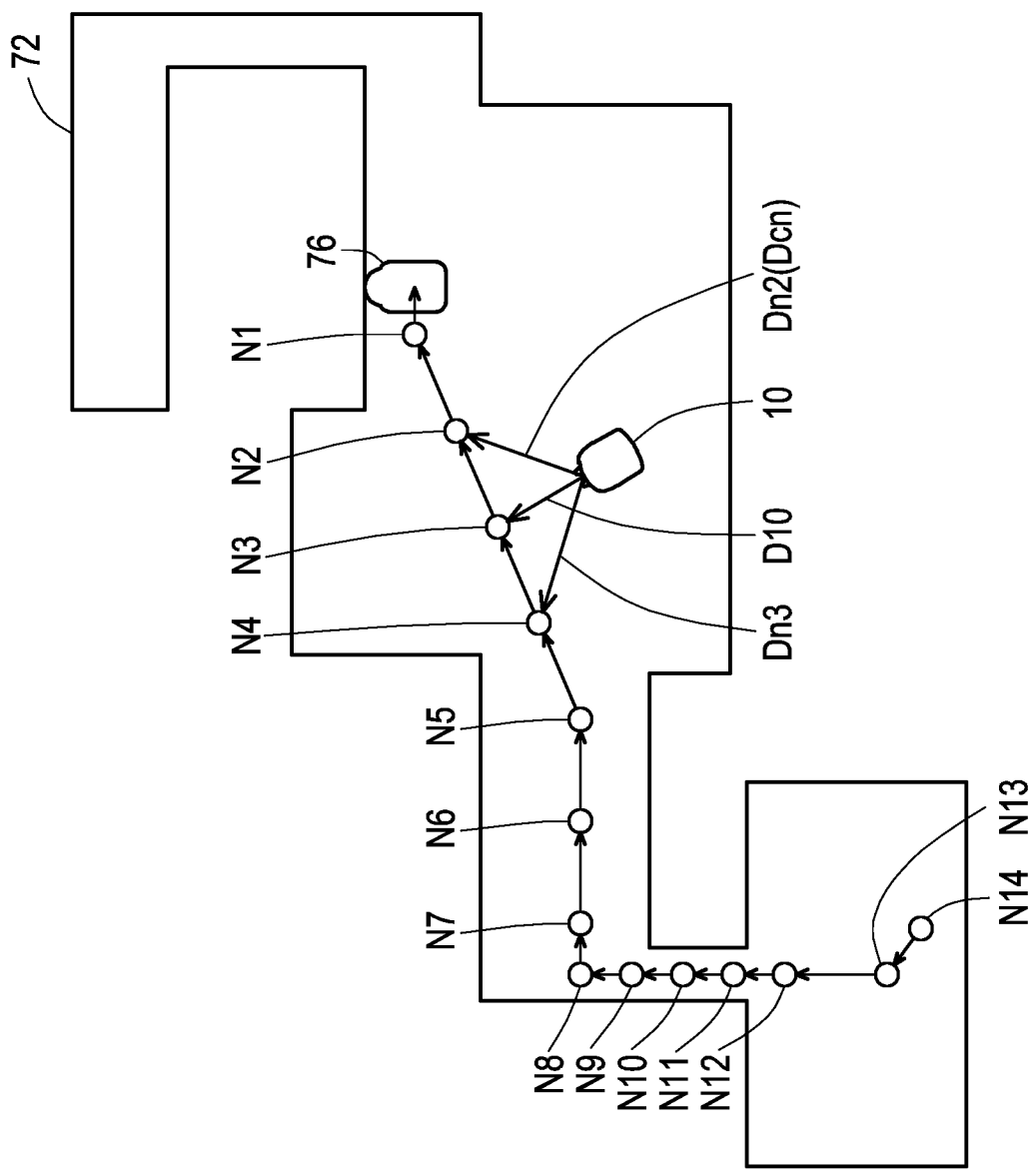
FIG. 12 is a schematic diagram illustrating the utility vehicle returning to a predetermined destination based on a return node map according to an embodiment of the disclosure.

FIG. 12 is a schematic diagram illustrating the utility vehicle returning to a predetermined destination based on a return node map according to an embodiment of the disclosure. Referring to FIG. 12, in an example embodiment, when there is more than one of the plurality of travel nodes (node N2 and node N3) that is closest to the current position of the autonomous work vehicle 10, the autonomous work vehicle 10 selects a node (node N2), among the more than one of the plurality of travel nodes (node N2 and node N3), which is located closest to a destination position (station 76) of the autonomous work vehicle 10 as the closest node.

In FIG. 12, the node N2 and the node N3 are closest to the current position of the autonomous work vehicle 10. That is to say, a first distance between the vehicle 10 and the node N2 is equal to or approximately equal to a second distance between the vehicle 10 and the node N3. However, since the node N2 is located closest to the destination position (the station 76), the direction of the node Dn2 is assigned as the direction of the closest node Dcn, instead of the direction of the node Dn3. After the direction of the closest node Dn2(Dcn) is obtained, the driving unit (motor 26) drives the autonomous work vehicle 10 in a direction moving towards the direction of the closest node Dn2(Dcn). In this way, the vehicle 10 may move efficiently by selecting a shorter travel route to the station 76.

Figure 13:
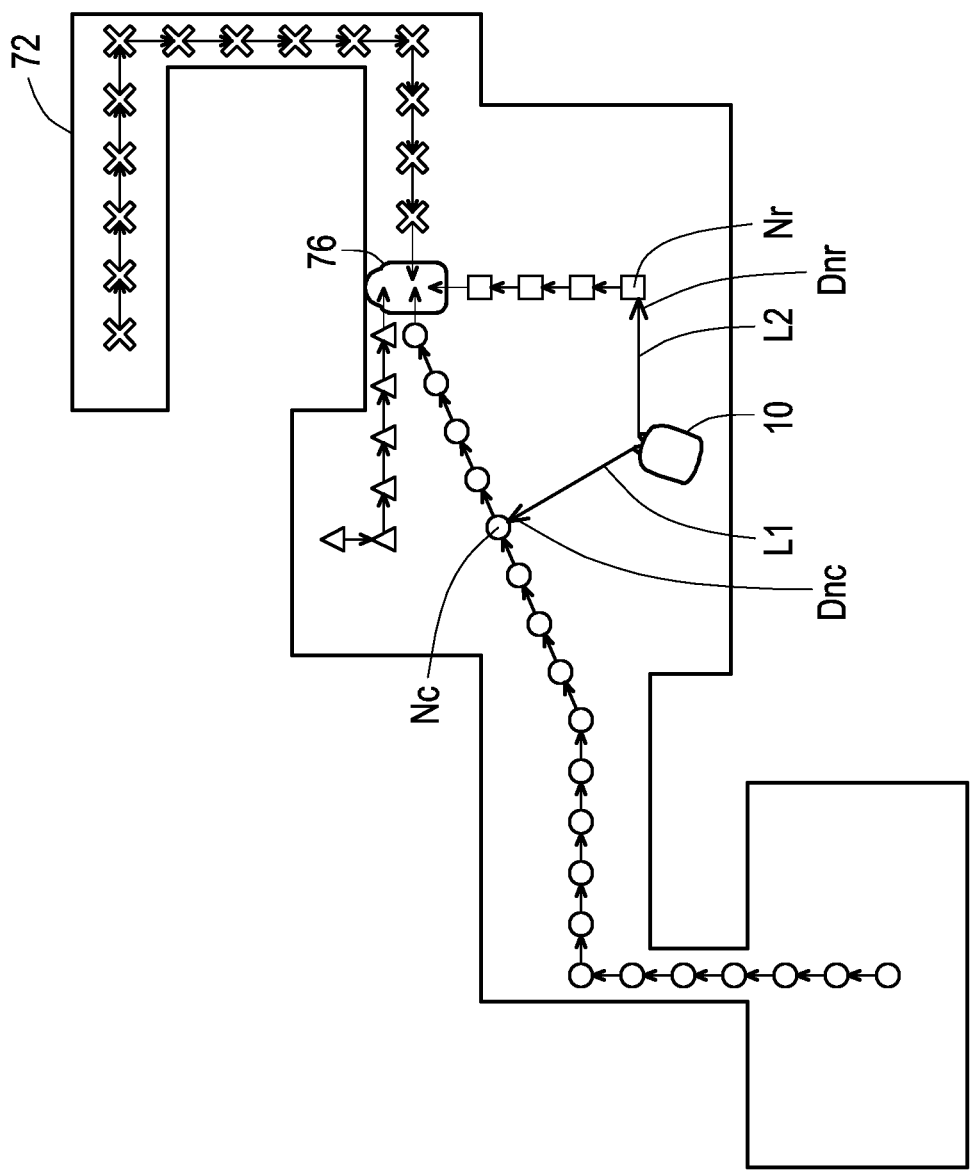
FIG. 13 is a schematic diagram illustrating the utility vehicle returning to a predetermined destination based on a return node map according to an embodiment of the disclosure.

FIG. 13 is a schematic diagram illustrating the utility vehicle returning to a predetermined destination based on a return node map according to an embodiment of the disclosure. Referring to FIG. 13, a plurality of travel routes to the charging station 76 are shown. For example, a first travel route to the charging station 76 is represented by circular travel nodes. A second travel route to the charging station 76 is represented by square travel nodes. A third travel route to the charging station 76 is represented by triangular travel nodes. A fourth travel route to the charging station 76 is represented by cross (X shaped) travel nodes. A number of the travel routes is not limited hereto, and may be set according to requirements.

Referring to FIG. 13, the travel nodes N represented by a circular node Nc and a rectangular node Nr are closest to the current position of the autonomous work vehicle 10. That is to say, a first distance L1 between the vehicle 10 and the circular node Nc is equal to or approximately equal to a second distance L2 between the vehicle 10 and the rectangular node Nr. Furthermore, a distance from the circular node Nc to the station 76 may be equal to or approximately equal to a distance from the rectangular node Nr to the station 76 (Note: in another embodiment of the disclosure, the distance from the circular node Nc to the station 76 may not be equal to or may not be approximately equal to the distance from the rectangular node Nr to the station 76).

Referring to FIG. 13, if the rectangular node Nr is located in an area that is less frequently travelled by the autonomous work vehicle 10 during a working of the autonomous work vehicle, the direction of the rectangular node Dnr may be assigned as the direction of the closest node Dcn, instead of the direction of the circular node Dnc. On the other hand, for example, if the circular node Nc is located in an area that is less frequently travelled by the autonomous work vehicle 10 during a working of the autonomous work vehicle, the direction of the circular node Dnc may be assigned as the direction of the closest node Dcn. In this way, the vehicle 10 may move efficiently and the formation of ruts may be reduced.

That is to say, in an embodiment of the disclosure, the autonomous work vehicle 10 may select a node, among the more than one of the plurality of travel nodes, which is located in an area that is less frequently travelled by the autonomous work vehicle 10 as the closest node. After the direction of the closest node Dcn is obtained, the driving unit (motor 26) drives the autonomous work vehicle 10 in a direction moving towards the direction of the closest node Dcn.

In order to determine which travel node N is located in an area that is less frequently travelled by the autonomous work vehicle 10 during a working of the autonomous work vehicle, the GPS coordinates which have been travelled by the vehicle 10 may be stored in the memory 44c of the vehicle 10. In another embodiment of the disclosure, a travel node N which the autonomous work vehicle has travelled through and/or a number of times a travel node N has been travelled through may be stored in the memory 44c of the vehicle 10. A travel node N may be considered as travelled through by the vehicle 10, for example, when the vehicle 10 passes within a predetermined radius of the travel node N. In this way, the travel node N which is located in an area that is less frequently travelled by the autonomous work vehicle 10 may be determined. The above are examples only of determining which travel node N is located in an area that is less frequently travelled by the autonomous work vehicle, however the disclosure is not limited thereto. In this way, the vehicle 10 may move more efficiently by selecting the travel nodes N by excluding the travel nodes N which have been travelled through. In this way, the formation of ruts due to the passage of the vehicle 10 may be reduced.

Figure 14:
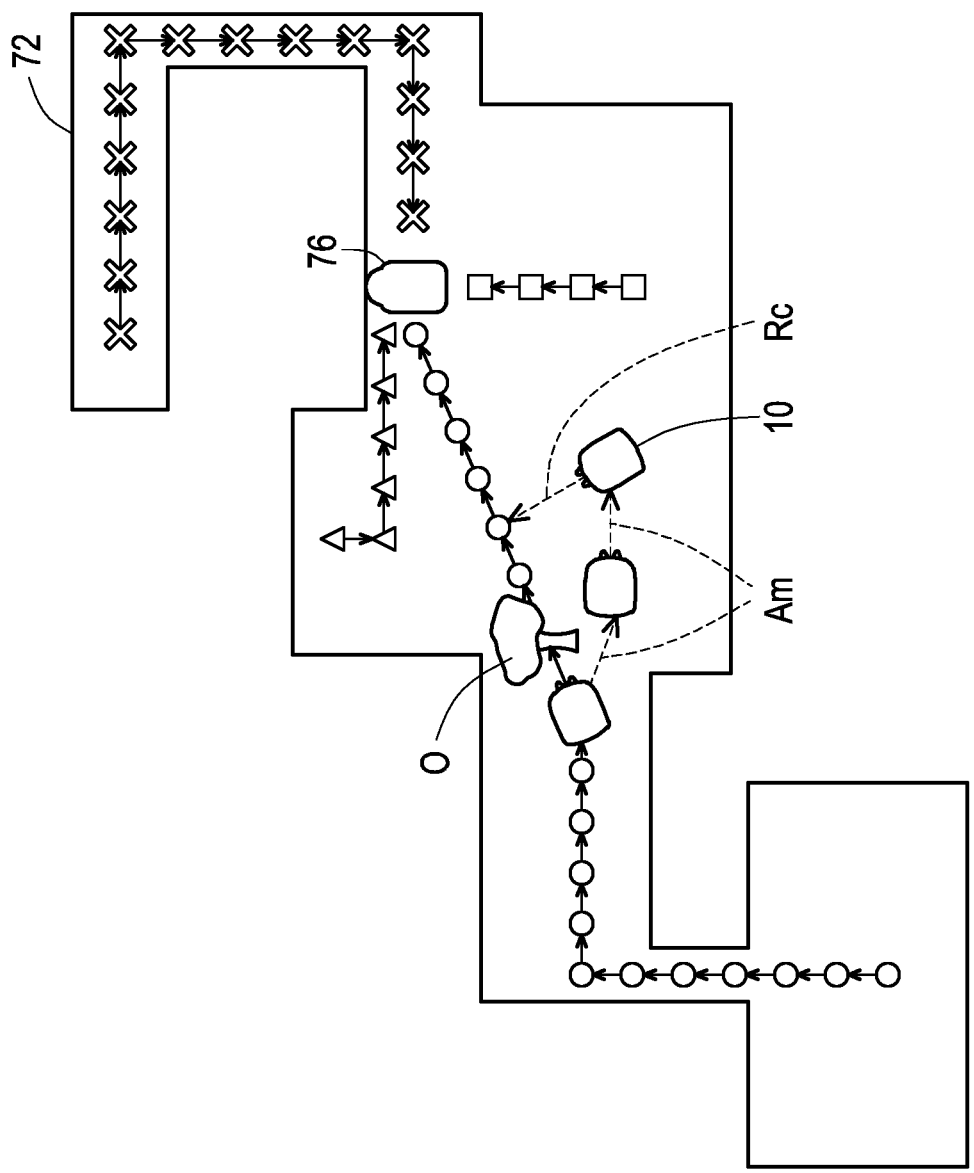
FIG. 14 is a schematic diagram illustrating the utility vehicle returning to a predetermined destination based on a return node map according to an embodiment of the disclosure.

FIG. 14 is a schematic diagram illustrating the utility vehicle returning to a predetermined destination based on a return node map according to an embodiment of the disclosure. Referring to FIG. 14, an obstacle O may be present in a travel path of the vehicle 10. The obstacle O may be, for example, a tree, a bench, a car, a weed, a restricted zone or the like which prevents the vehicle 10 from travelling forward.

In an embodiment of the disclosure, when the vehicle 10 collides with the obstacle O, the collision (contact) sensor 40 detects the collision. After the obstacle O is detected by the vehicle 10 via the collision sensor 40 detecting the collision, the control unit of the vehicle 10 performs an avoidance maneuver Am to avoid the obstacle O. That is to say, the vehicle 10 temporarily deviates from the travel route specified by the plurality of travel nodes N to avoid the obstacle O. In other words, the vehicle 10 temporarily deviates from the direction information specified by the travel node N.

The avoidance maneuver may be, for example, a changing of the travelling direction of the vehicle 10. That is to say, the avoidance maneuver may be a maneuver in which the ECU 44 steers the vehicle 10 away from the obstacle O. For example, the vehicle 10 may back up in the rear direction after the collision, then the ECU 44 turns the travelling direction of vehicle 10 by a predetermined turning angle, for example, by 130 degrees, and then travels forward for a predetermined distance or a predetermined time. In another embodiment, the ECU 44 may turn the travelling direction of the vehicle 10 by a predetermined turning angle of 90 degrees. The turning angles are not limited thereto and may be other angles according to requirements. In an embodiment of the disclosure, the travelling direction of the vehicle 10 may be turned by a relatively large angle such as between 90 degrees and 180 degrees. In another embodiment, the travelling direction of the vehicle 10 may be turned by a relatively small angle such as between 10 degrees and 90 degrees. A number of times the vehicle 10 changes direction to avoid the obstacle O is not limited to one, and may be a plurality of number of times set according to requirements.

In an another embodiment of the disclosure, instead of the collision (contact) sensor 40 detecting a collision with the obstacle O, a laser sensor or a camera including an image sensor disposed on the vehicle 10 may detect an obstacle O in the travel path of the vehicle 10 without the vehicle 10 colliding with the obstacle O. The camera and the laser sensor may be configured to detect obstacles such as, for example, a tree, a bench, a car, a weed, a restricted zone or the like. When the obstacle O is detected which prevents the vehicle 10 from advancing or reaching its destination, the vehicle 10 may perform the avoidance maneuver to avoid the obstacle in the travel path.

When the obstacle O is detected, the ECU 44 changes the traveling direction of the vehicle 10 and drives the vehicle 10 for a predetermined time or a predetermined distance. In addition, the traveling direction of the vehicle 10 may be changed more than one time during the avoidance maneuver Am such as shown in FIG. 14.

As described above, the autonomous work vehicle 10 is configured to perform an obstacle avoidance maneuver Am when the autonomous work vehicle 10 detects an obstacle O while moving towards the direction of the closest node Dcn, or while the vehicle 10 is following the direction specified by the travel node N. Then, after the avoidance maneuver Am is performed, the autonomous work vehicle 10 recalculates Rc the direction of the closest node Dcn that is closest to the current position of the autonomous work vehicle as shown in FIG. 14. In this way, the movement of the vehicle 10 will not be hindered by the presence of obstacles O.

Figure 15:
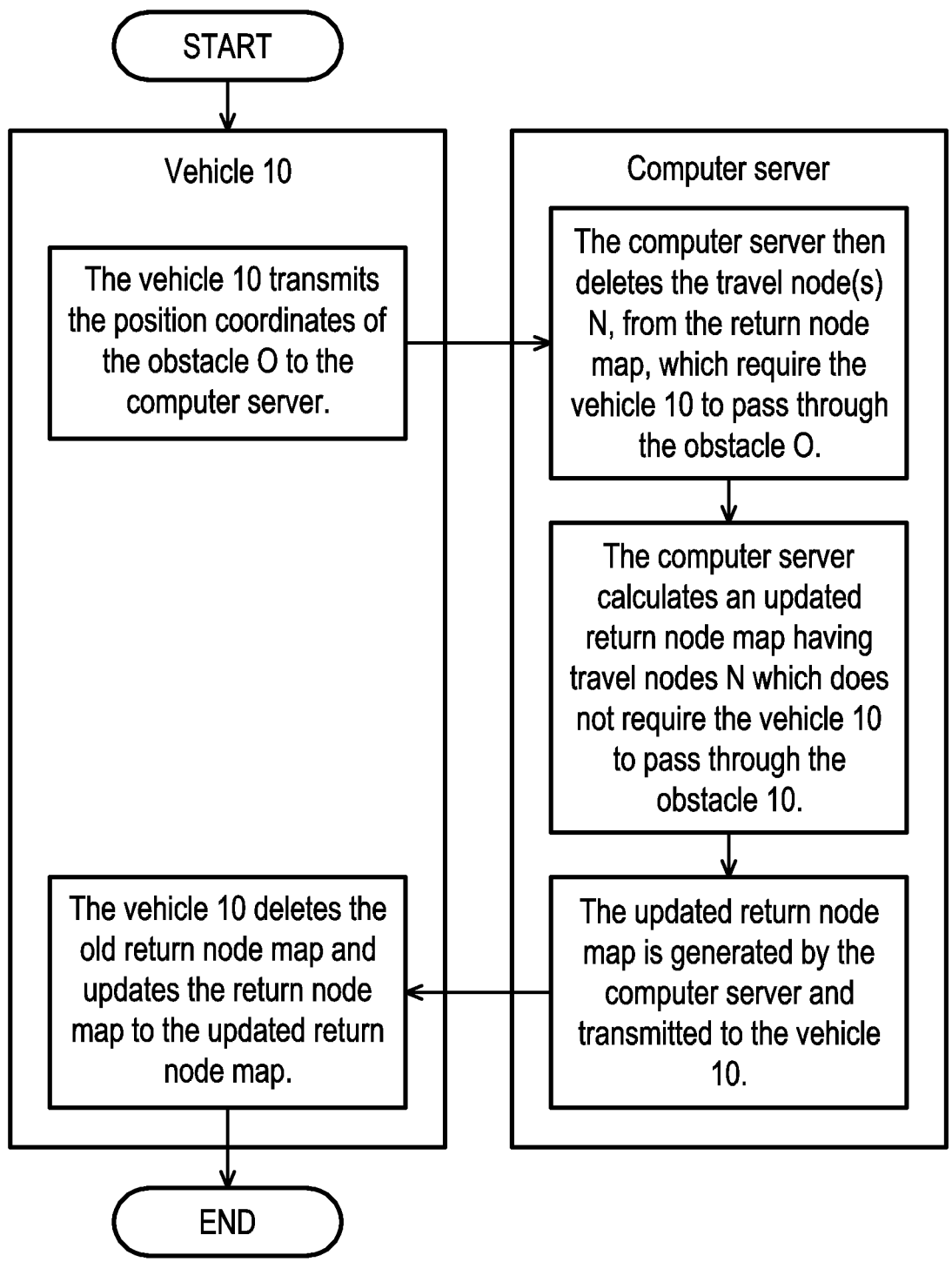
FIG. 15 is a schematic diagram illustrating an update of a return node map according to an embodiment of the disclosure.

FIG. 15 is a schematic diagram illustrating an update of a return node map according to an embodiment of the disclosure. Referring to FIG. 14 and FIG. 15, the position coordinates of where the vehicle 10 collided with/identified the obstacle O is stored in the memory of the vehicle 10. The vehicle 10 transmits the position coordinates of the obstacle O to the computer server. The computer server then deletes the travel node(s) N, from the return node map, which require the vehicle 10 to pass through the obstacle O. Next, the computer server calculates an updated return node map having travel nodes N which does not require the vehicle 10 to pass through the obstacle 10. The updated return node map is generated by the computer server and transmitted to the vehicle 10. After the vehicle 10 receives the updated return node map generated by the computer server, the vehicle 10 deletes the old return node map and updates the return node map to the updated return node map.

In the above embodiment, the updated return node map is calculated and updated by the computer server. However, in another embodiment of the disclosure, the updated return node map may also be calculated and updated by the processor onboard the vehicle 10. When the updated return node map is calculated by the computer server, the processing power needed for the processor on the vehicle 10 may be reduced.

Figure 16:
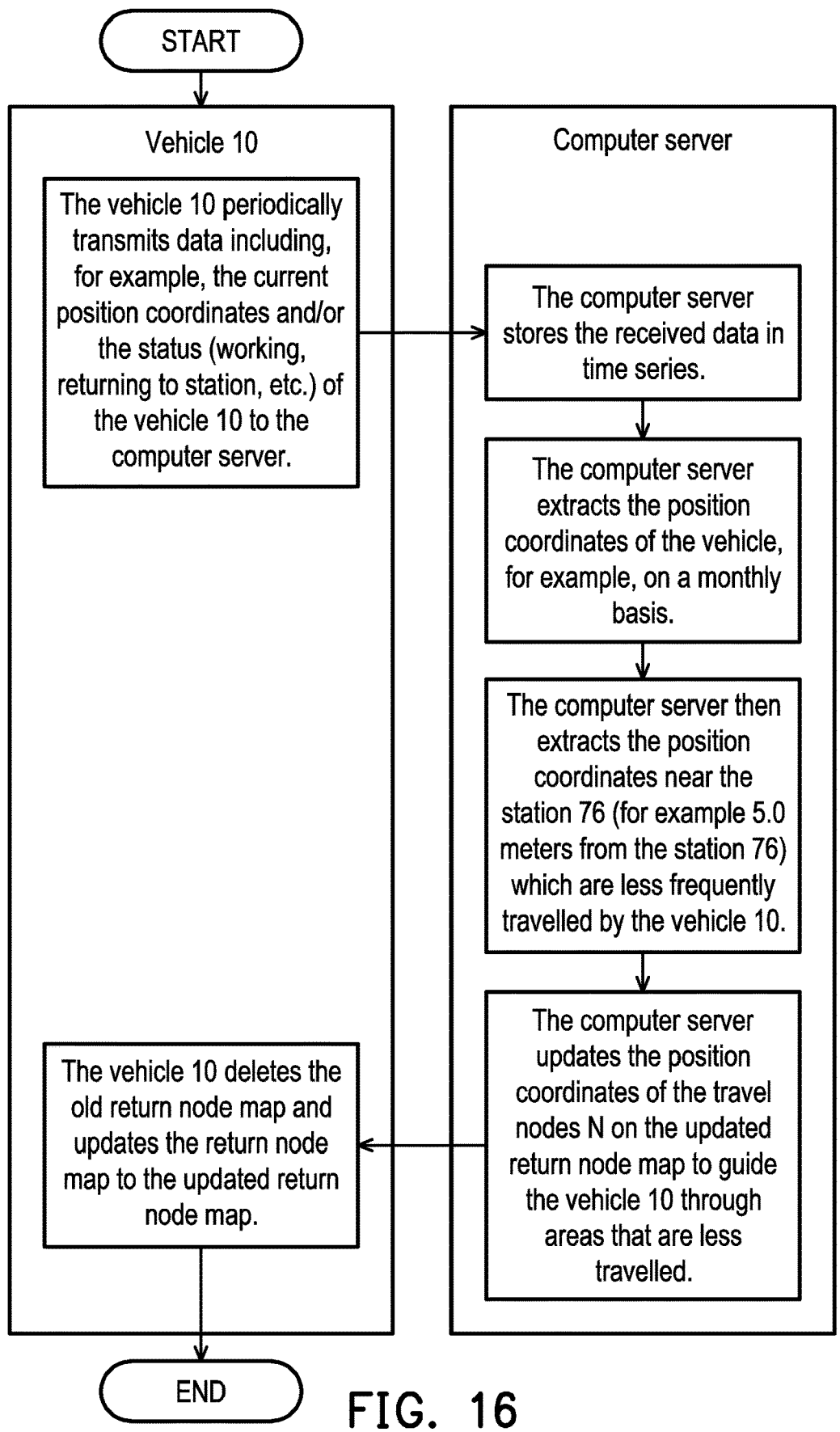
FIG. 16 is a schematic diagram illustrating a return node rut avoidance calculation according to an embodiment of the disclosure.

FIG. 16 is a schematic diagram illustrating a return node rut avoidance calculation according to an embodiment of the disclosure. Referring to FIG. 16, the vehicle 10 periodically transmits data including, for example, the current position coordinates and/or the status (working, returning to station, etc.) of the vehicle 10 to the computer server. The computer server stores the received data in time series. Next, the computer server extracts the position coordinates of the vehicle, for example, on a monthly basis. The computer server then extracts the position coordinates near the station 76 (such as position coordinates within a predetermined radius, for example 5.0 meters, from the station 76 may be extracted) which are less frequently travelled by the vehicle 10. Less frequently travelled may include not travelled by the vehicle 10. The computer server may update the position coordinates of the travel nodes on the return node map to guide the vehicle 10 through areas that are less travelled to achieve rut avoidance. The updated return node map is generated by the computer server and transmitted to the vehicle 10. After the vehicle 10 receives the updated return node map generated by the computer server, the vehicle 10 deletes the old return node map and updates the return node map to the updated return node map.

In an embodiment of the disclosure, there may be a case where there are a plurality of stations 76 and a plurality of vehicles 10. The number of stations 76 corresponds to, for example, the number of vehicles 10. For example a work area may include a first station and a second station, and a first vehicle and a second vehicle. When the first vehicle is docked at the first station, the return node map of the second vehicle may be updated, for example, via the computer server such that the second vehicle does not dock at the first station that is occupied by the first vehicle. That is to say, the travel node N leading to the first station may be deleted by the computer server, or the travel node N leading to the first station identified by the second vehicle such that the second vehicle does not travel to the first station which is occupied by the first vehicle.

In the above described embodiments, the vehicle 10 that is a robotic lawnmower including a blade for cutting grass was described. However, the disclosure is not limited thereto, and the vehicle 10 may be a cultivator for farming, a snow plow for plowing snow, a transport vehicle for transporting goods, or the like.

Although embodiments of a travel route control of the autonomous work vehicle using a global navigation satellite system (GNSS) of the disclosure have been described above based on some examples, the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An autonomous work vehicle, comprising:
   a position information obtaining unit, comprising a GNSS receiver, acquiring a position of the autonomous work vehicle;
   a driving unit, comprising a motor;
   a control unit, comprising a processor;
   a memory, storing a position of a plurality of travel nodes to guide the autonomous work vehicle to a charging station where the autonomous work vehicle docks to recharge power;
   wherein when the autonomous work vehicle is to return to the charging station, the processor calculates a direction of a closest node, among the plurality of travel nodes, that is closest to a current position of the autonomous work vehicle, and the driving unit drives the autonomous work vehicle in a direction moving towards the direction of the closest node calculated by the processor,
   wherein the control unit is configured to calculate distances between the autonomous work vehicle and the plurality of travel nodes, and when the control unit determines there is more than one of the plurality of travel nodes that is closest to the current position of the autonomous work vehicle, the autonomous work vehicle selects a node, among the more than one of the plurality of travel nodes, which is located in an area that is less frequently travelled by the autonomous work vehicle as the closest node.

2. The autonomous work vehicle according to claim 1, wherein each of the plurality of travel nodes is stored with a direction information specifying a direction in which the autonomous work vehicle is to advance.

3. The autonomous work vehicle according to claim 1, wherein a travel node which the autonomous work vehicle has travelled through is stored in the memory.

4. The autonomous work vehicle according to claim 1, wherein the autonomous work vehicle is configured to perform an obstacle avoidance maneuver when the autonomous work vehicle detects an obstacle while moving towards the direction of the closest node, and
   after the avoidance maneuver is performed, the autonomous work vehicle recalculates the direction of the closest node that is closest to the current position of the autonomous work vehicle.

5. The autonomous work vehicle according to claim 1, further comprising:
   a communication unit, configured to communicate with a server,
   wherein information regarding the plurality of travel nodes is obtained from the server.

6. The autonomous work vehicle according to claim 1, wherein the autonomous work vehicle is a lawn mower.

* * * * *